Figure 4:
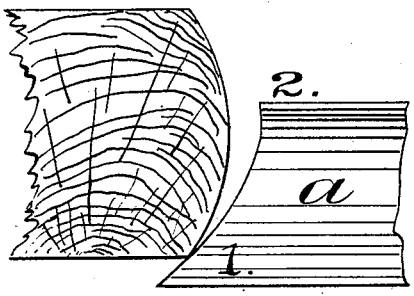
Figure 5:
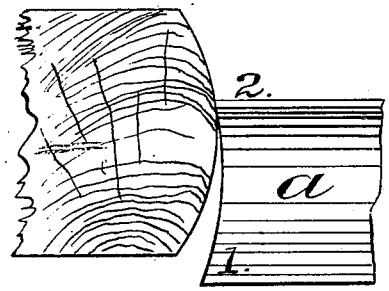
Figure 6:
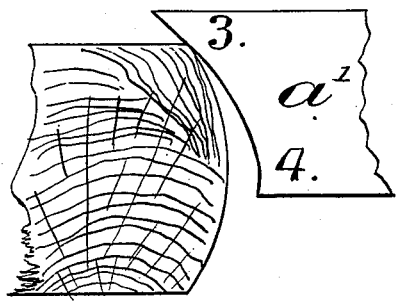
Figure 7:
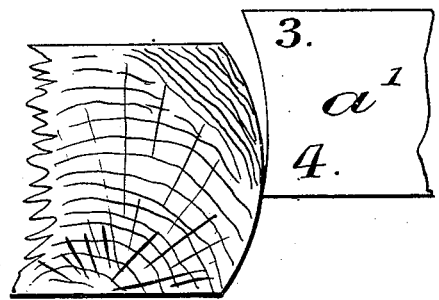

No. 680,225. Patented Aug. 13, 1901.
I. CHORLTON & W. J. WENTWORTH.
ROTARY CUTTER.
(Application filed Nov. 6, 1900.)
(No Model.) 2 Sheets—Sheet 1.
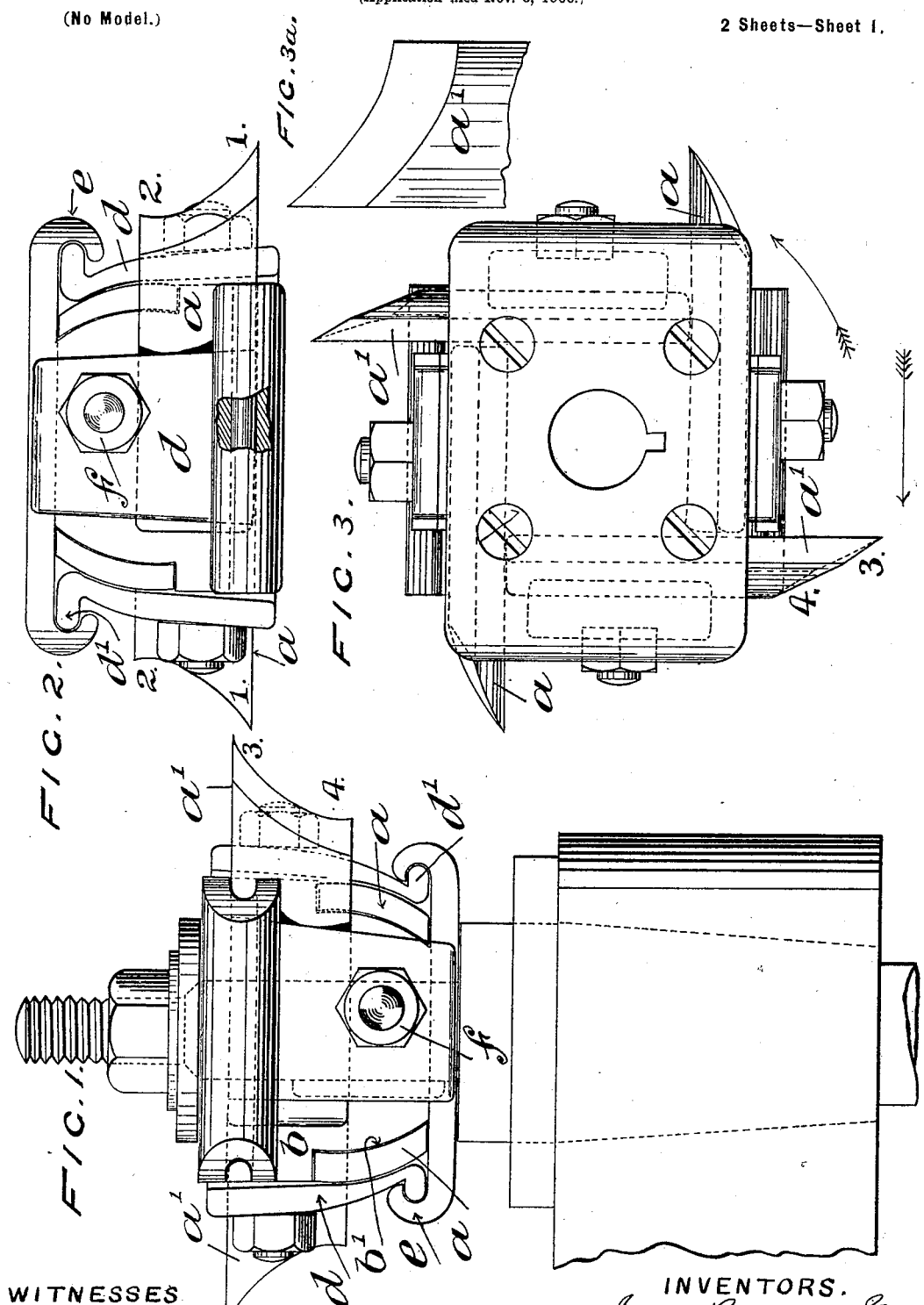
WITNESSES
Ella L. Gilee
Clara D. Frohlach
INVENTORS.
Isaac Chorlton &
Walter J. Wentworth
By their Attorneys Richard No. 680,225. Patented Aug. 13, 1901.
I. CHORLTON & W. J. WENTWORTH.
ROTARY CUTTER.
(Application filed Nov. 6, 1900.)
(No Model.) 2 Sheets—Sheet 2.

WITNESSES.
Ella L. Giles
Clara D. Frohlach

INVENTORS.
Isaac Chorlton &
Walter J. Wentworth
By their Attorneys Richards

UNITED STATES PATENT OFFICE.

ISAAC CHORLTON AND WALTER JAMES WENTWORTH, OF MANCHESTER, ENGLAND.

ROTARY CUTTER.

SPECIFICATION forming part of Letters Patent No. 680,225, dated August 13, 1901.

Application filed November 6, 1900. Serial No. 35,598. (No model.)

*To all whom it may concern:*

Be it known that we, ISAAC CHORLTON, spring-mattress manufacturer, residing at 17 Blackfriars street, and WALTER JAMES WENT-WORTH, foreman, residing at 35 White street, Seedley, Manchester, in the county of Lancaster, England, subjects of the Queen of Great Britain and Ireland, have invented certain new and useful Improvements in Rotary Cutting, Planing, and Shaping Appliances for Woodworking Machinery, (for which we have made application in Great Britain, No. 6,996, dated April 14, 1900,) of which the following is a specification.
Our said invention relates to rotary cutting, planing, and shaping appliances for use in woodworking machinery.

According to our invention we so arrange the cutters upon the carrier-block and in some instances so shape the cutters that the cutting edges in operating upon the wood have an angular or shearing effect, which makes a clean smooth cut, even when the appliance is working against the grain or fiber of the wood or when the wood is curly or cross-grained. This effect we obtain by giving lead or curve or inclination to the cutter and by forming the carrier-block in such a manner as to hold the tool at the desired angle, inclination, or curve.

A subsidiary part of our invention relates to the carrier-blocks and to improved means for seating and clamping the tools.

Our invention is particularly useful for rounding off or molding and rabbeting the sides or edges of wooden bars or parts, in which operation the cutters may require to work within a curve or sector of ninety degrees, thus encountering the fiber or grain at various angles and subject to increased difficulties in obtaining a clean smooth cut.

The nature of our invention and the manner of carrying the same into effect will be clearly understood from the following description, in which reference will be made to the annexed drawings.

On Sheet 1 of the said drawings, Figure 1 shows a side elevation of a rotary cutter for planing on the round with the cutters formed and mounted in accordance with our invention. Fig. 2 is a side elevation of Fig. 1. Fig. 3 is a plan view of Fig. 2. Fig. 3ª is a detail view of one of the cutters or tools. On Sheet 2, Figs. 4 to 8 are diagrams illustrating the principle of the shearing or angular cut or planing effect obtained by the use of cutters formed and mounted as in Sheet 1.

Under the first form of our invention and as applied to planes for rounding off or molding we mount a suitable number of cutters $a\,a'$ upon a block or carrier $b$. These cutters are preferably formed from a dished or rounded piece of flat steel and are ground to present concave cutting edges, the points 1 3 of the cutting edges of the tools projecting considerably beyond the points 2 4, as clearly shown in Figs. 1, 2, and 3. The cutter-blades $a\,a'$ are ground to such a curve as will correspond to the desired curve of the finished rounded cut or shoulder of the wood at the shearing angle of the cutting edge. In addition to the shearing angle and curve the cutting edge of each tool $a\,a'$ is set to operate progressively from one side to the other, the leading edge coming into operation first, the cutter progressively effecting the rounding of the shoulder as the operation proceeds. In order to obtain this progressive cut, the sides of the carrier $b$ are formed with convex faces $b'$, to which the cutters are clamped, such convex faces lying at an angle relatively to the axis of the carrier. The cutters $a\,a'$ are mounted, one at the top and the other at the bottom, on alternate sides of the block or carrier $b$, the projecting edges 1 3 of the cutters lying toward the top and bottom of the said block or carrier. When a block provided with cutters so formed and mounted is set to work, the projecting end of each cutter first encounters the wood, the action of the full width of the cutter progressively following, so that each cutter works gradually across the grain, moving from the edge toward the center of the work and cleanly planing the timber to a convex shape. The progressive or shearing action of the cutters will be clearly understood from the diagrams in Sheet 2. In this sheet Figs. 4 and 5 indicate the action of the lower cutters $a$, the point 1 of which strikes the timber first, (see Fig. 4,) the full width of the tool coming into action progressively until the point 2 ultimately finishes the cut, by which time the leading point 1 has moved clear away from the work. (See Fig. 5.) The action of the upper cutters a' (indicated in Figs. 6 and 7) is precisely the same, the point 3 first encountering the timber (see Fig. 6) and the cutting edge of the tool progressively coming into action until the point 4 completes the cut. When the point 4 strikes, the point 3 is in advance and clear, having performed its work already, as will be understood.

Figure 8:
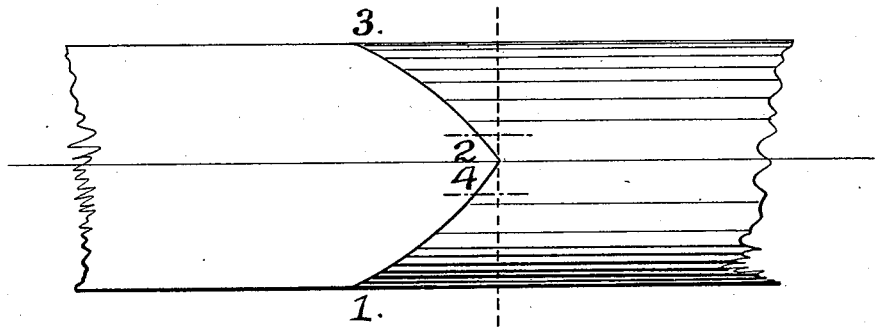

Fig. 8 is a diagram of a piece of timber partially planed by the tools working in accordance with our invention, the plane mark of the lower cutters $a$ being indicated by the curve 1 to 2 and that of the upper cutters $a'$ by the curve 3 to 4. With cutters formed and mounted as above described the cutting-tools are prevented from ever meeting opposing or cross-grained fibers absolutely face to face, so that a smooth shearing cut is insured and improved results obtained. By disposing the cutters on alternate sides of the block or carrier one-half only of the timber is planed at a time and the timber not being under the simultaneous action of two cutters is less likely to be splintered.

We prefer to form the carrier $b$ and clamping parts in such a manner that the tools or chisel-cutters $a$ $a'$ are not slotted or interfered with, so that the said cutters are stronger and can be cut in suitable lengths from bar-tool steel and at once ground and applied without any forging or slotting, whereby considerable economy in the preparation and material of the tools is effected.

In order to secure the cutting-tools $a$ $a'$ to the revolving block $b$, we employ suitably-shaped clamps $d$, one edge of each clamp, which may be beaded, as at $d'$, taking into a groove, channel, or recess $e$, formed on or attached to the block $b$, the other edge of the clamp being secured to the block by means of nuts or bolts $f$. By this method of securing the cutters are much more firmly held and can be more readily adjusted. In addition to this the life of the cutters is prolonged, owing to the fact that even a short cutter can be very firmly held by the clamp. These arrangements are not, however, necessary parts of our invention, and we might, if thought desirable, secure the cutters by means of the usual headed bolts which engage the blocks and pass through slots formed in the cutters, the cutters being held to the blocks by nuts and washers.

We declare that what we claim is—

1. A rotary planing appliance for planing or shaping rounded-off or curved tops, edges, shoulders or the like upon pieces of timber, consisting of a carrier-block $b$ carried on a spindle and having formed thereon convex or curved faces or recesses lying at an angle to the axis of the carrier-block and adapted to receive cutting tools or chisels $a$ and $a'$, formed from the unslotted pieces of correspondingly-curved tool-steel, the said tool or tools being held in position by a clamp or clamps and so shaped and set at the cutting edge or edges as to bring about an angular or shearing or drawing cut, for the purposes and substantially as described.

2. In a rotary cutting-tool having cutting-tools $a$ $a'$ means for securing or clamping the cutter blades or tools without the necessity for slotting the same to the revolving block consisting of a clamp or washer hooked, pivoted or otherwise loosely connected to the block and designed to bear on the tool and secure the same to the said block, substantially as herein described.

In witness whereof we have hereunto set our hands in presence of two witnesses.

ISAAC CHORLTON.
   WALTER JAMES WENTWORTH.

Witnesses:
 RICHARD WEBSTER IBBERSON,
 ALFRED YATES.